United States Patent [19]

Kovach

[11] 3,864,277

[45] Feb. 4, 1975

[54] HARD GRANULAR ACTIVATED CARBON AND PREPARATION FROM A CARBONACEOUS MATERIAL A BINDER AND AN INORGANIC ACTIVATING AGENT

[75] Inventor: Julius Louis Kovach, Columbus, Ohio

[73] Assignee: North American Carbon, Inc., Columbus, Ohio

[22] Filed: Aug. 14, 1972

[21] Appl. No.: 280,118

Related U.S. Application Data

[63] Continuation-in-part of Ser. No. 37,858, May 15, 1970, abandoned.

[52] U.S. Cl.................. 252/423, 252/422, 252/444, 423/449
[51] Int. Cl............................................. C01b 31/08
[58] Field of Search ........................... 252/421–425, 252/445, 444; 208/21, 23, 6; 423/449, 445

[56] References Cited
UNITED STATES PATENTS

| | | | |
|---|---|---|---|
| 1,462,752 | 7/1923 | Jacobs | 252/421 |
| 1,527,083 | 2/1925 | Schmidt | 252/421 |
| 1,575,703 | 5/1926 | Clemm | 252/425 |
| 2,008,145 | 7/1935 | Morrell | 252/425 |
| 2,083,303 | 6/1937 | Kreczil | 252/421 |
| 2,508,474 | 5/1950 | Slyh et al. | 252/422 |
| 2,632,738 | 3/1953 | Hassler et al. | 252/421 |
| 3,079,266 | 2/1963 | Galy | 252/421 |
| 3,595,806 | 7/1971 | Prahacs et al. | 252/421 |
| 3,649,196 | 3/1972 | Degginger | 252/422 |

FOREIGN PATENTS OR APPLICATIONS 266,674   11/1927   Great Britain ..................... 252/422

*Primary Examiner*—Daniel E. Wyman
*Assistant Examiner*—P. E. Konopka
*Attorney, Agent, or Firm*—Cennamo, Kremblas & Foster

[57] ABSTRACT

A method of manufacturing reconstituted activated carbon by employing chemical activation of a novel mixture of a carbonaceous raw material and a carbonaceous binder material and an activating agent to produce a very hard, granular activated carbon with superior abrasion-resistance.

6 Claims, No Drawings

3,864,277

HARD GRANULAR ACTIVATED CARBON AND PREPARATION FROM A CARBONACEOUS MATERIAL A BINDER AND AN INORGANIC ACTIVATING AGENT

This application is a continuation-in-part of my copending application Ser. No. 37,858, filed May 15, 1970 now abandoned.

BACKGROUND

The present invention relates generally to methods of manufacturing activated carbon, and particularly to a novel method of manufacturing activated carbon in granular form which exhibits superior hardness and abrasion resistance properties.

Activated carbons are produced commercially using either the steam or the chemical activation process. The steam activation process is employed using raw materials which have been substantially or completely carbonized, either naturally as in the metamorphosis of cellulosic materials to lignite and bituminous coal; or artificially by heating a carbonaceous raw material in the absence of air to temperatures typically as high as 600°C in carbonization retorts or furnaces.

In either case, carbonization of the carbonaceous raw material decomposes the original carbon-hydrogen-oxygen compounds by expelling oxygen and gaseous compounds of carbon, hydrogen and oxygen; thereby reducing the volatile content and increasing the carbon content. Generally speaking, a carbonized raw material suitable for commercial use in the steam activation process will have an oxygen content less than 25 percent on a moisture and ash free basis.

The embryonic pore structure which results from carbonization permits the entrance of water in the form of steam. The controlled oxidation of the remaining carbon by steam at temperatures above approximately 700°C is the mechanism of steam activation. In practice commercially, the temperatures are typically much higher. By this process, the embryonic pore structure created by carbonization is extended and enlarged, thereby creating an extensive surface area and pore volume within the particle.

If the carbonized raw material is soft, such as wood charcoal, lignite, or bituminous coal, for example, the steam activation process produces a soft activated carbon product.

If the carbonized raw material is hard, such as coconut shell charcoal; or bituminous coal which has been ground and reconstituted with pitch binders into granular forms to increase its hardness, then the steam activation process produces a harder activated carbon product.

Generally speaking, most gas phase and column type liquid phase applications require a hard, abrasion resistant carbon having a ball-pan hardness value of at least 85 and preferably 90. In most cases, these requirements are met with a carbon produced by the steam activation process from hard, carbonized raw material.

The chemical activation process, on the other hand can be usefully employed commercially only with raw materials which have not been carbonized to any great extent. As its content of oxygen and hydrogen is reduced, a carbonaceous raw material becomes less activatable by the chemical process, since the mechanism of the chemical process involves the selective and substantially complete removal of oxygen and hydrogen, as opposed to carbon, by the chemical activating agent at temperatures below approximately 650°C; thereby accomplishing simultaneous carbonization and activation.

Generally speaking, carbonaceous raw materials having an oxygen content less than 25 percent and a hydrogen content less than 5 percent are not suitable for use in the chemical activation process, since the amount of activation which can be accomplished is too small to be commercially useful. Suitable carbonaceous raw materials range from preferred materials such as wood and straw, which have an oxygen content of appoximately 49 percent and a hydrogen content of appoximately 6 percent on a moisture and ash free basis; to such materials as the low rank brown coals having oxygen and hydrogen contents of at least approxiamtely 25 and 5 percent respectively.

The chemical activation process is further limited, in commercial practice, to those carbonaceous raw materials which are sufficiently porous to readily permit the absorption of chemical activating agent solutions in quantity sufficient to accomplish the simultaneous carbonization and activation of the raw materials which occur in the chemical activation method. Since materials of sufficient porosity are almost invariably soft, and since hard materials almost invariably lack sufficient porosity, the chemical activation process has been limited in commercial practice to soft carbonaceous raw materials, and soft activated carbon products have been the end result.

For this reason, the use of chemically activated carbons has been limited, prior to the present invention, to those applications where hardness and abrasion resistance is not required, usually liquid phase applications where the carbon is used in finely divided or powdered form. Granular chemically activated carbons are seldom used in gas phase and column type liquid phase applications because they lack sufficient hardness and abrasion resistance to withstand the rigours of this type of service, which represents a very large percentage of the commercial market.

Since the chemical activation process is inherently capable of producing the widest range of pore structure, from small to large average pore diameters, for both gas and liquid phase applications, there has been a long standing need for a method of competitively producing hard, granular activated carbon from soft carbonaceous raw materials by chemical activation.

This long standing need is evidenced, for example, by U.S. Pat. No. 2,508,474. This patent discloses a chemical activation process which acknowledges the desire for a hard carbon product and apparently achieves hardness values between 81 to 87. However, this process does not teach the use of binders as disclosed by Applicant and employs a relatively complex and expensive method with many steps involved. Such a process is not known by me to be employed commercially at present, which is evidence that the cost is commercially impractical and not really competitive to steam activated carbon products in price or quality.

Prior to the present invention, no further efforts in this direction have provided a solution to fulfill this need.

SUMMARY OF INVENTION

In general, the method of the present invention comprises the novel step of incorporating certain carbonaceous binder materials with the chemical activating agent and the carbonaceous raw material prior to the forming step and the simultaneous carbonization/activation of the mixture. This novel method, which is particularly adapted to soft, carbonaceous raw materials, surprisingly results in a very hard, abrasion resistant, highly activated carbon product.

OBJECTS

It is therefore a primary object of the present invention to provide a novel method for the manufacture of activated carbon reconstituted from relatively soft raw materials by the chemical activation process which results in a highly active carbon having superior hardness and abrasion resistance and which is suitable for both gas phase and liquid phase applications.

DETAILED DESCRIPTION

The method of the present invention consists generally of grinding the carbonaceous raw material until it becomes finer than at least 40 mesh on the ASTM E-11 Sieve Series, then mixing the ground raw material, the chemical activating agent and the carbonaceous binder materials in predetermined proportions.

The carbonaceous raw material may be any solid organic raw material consisting primarily of carbon, hydrogen and oxygen, which contains at least 25 percent by weight of oxygen on a moisture and ash free basis; and which possesses sufficient porosity to absorb the quantity of chemical activating agent required to decompose the material by the selective and substantially complete removal of its content of oxygen and hydrogen without significant removal of its carbon content, whereby a system of pores contained within an amorphous carbon structure may be created.

The carbonaceous binder material as employed in the present invention, may be any organic raw material consisting primarily of carbon, hydrogen and oxygen, having a carbon content less than 60 percent and an oxygen content greater than 30 percent on a moisture and ash free basis, which is either soluble or emulsifiable in water or solutions of the inorganic chemical activating agent; and which is capable of being decomposed by the activating agent in such a way as to selectively and substantially remove its content of oxygen and hydrogen without significant removal of its carbon content.

A preferred binder material for use in the present invention is some form of lignosulfonate.

It has also been discovered that a mixture of ground cellulosic materials, such as wood, with binders, as defined in the present invention, such as, for example, lignosulfonate, will not produce the same excellent results as achieved in the present invention; if particles formed from such a mixture are steam activated, in lieu of chemical activation as taught herein.

The chemical activating agents comprise those well-known chemicals which are capable of selectively removing oxygen and hydrogen as opposed to carbon from carbonaceous materials. While any of the commonly employed agents may be used in the method of the present invention, phosphoric acid and zinc chloride are preferred in that order.

Depending upon the level of activity desired, and whether the carbon is required for a gas or liquid phase application, the ratio of 100 percent phosphoric acid to dry basis carbonaceous materials will be at least approximately 0.35:1 for some gas phase carbons and as great as approximately 1.35 to 1 as typically employed for chemically activated powdered carbons for liquid phase applications.

Mixing of the ground raw material, binder and activating agent in any suitable conventional manner results in a mixture having a consistency such that predetermined forms may be shaped which will withstand the tumbling action of a conventional rotary activation furnace. After mixing, the mixture is formed into the desired particle shapes, which are than placed in the carbonization/activation furnace, where they are heated to a temperature which ordinarily does not exceed 650°C for a period of time which is usually less than 3 hours in a substantially ambient furnace atmosphere. Ambient furnace atmosphere, as used herein, is defined as that which results from the substantially complete combustion of natural gas or fuel oil in a furnace.

The temperature and duration of the carbonization/activation heat treatment of the present invention are varied according to the composition of the mixture and the properties desired in the activated carbon end product.

Alternatively, the ambient furnace atmosphere may be modified by the introduction of a sweep gas such as air or steam merely to accelerate flushing of the decomposition products of the carbonization/activation heat treatment. It should be pointed out that if steam is used as a flushing medium as mentioned, there should be no confusion as to possible steam activation of the mixture since the temperatures are too low for this to occur.

After the carbonization/activation heat treatment, the activated carbon particles are washed to remove and recover the phosphoric acid values and dried in a conventional manner.

The surprising and totally unexpected result of this procedure is a highly activated carbon of desired shape and size which is extremely hard and abrasion resistant, with ball-pan hardness values for these particles reaching as high as 97 percent.

Although it is unknown as to exactly what occurs to cause this surprising result, it is theorized that the raw material is impregnated by the activating agent and coated by the binder material, while the latter becomes intimately admixed with the activating agent during the mixing step. During heat treatment of the shaped particles of the mixture, the raw material is simultaneously carbonized and activated, and the binder material is also similarly decomposed to possibly supply activated carbon bonds between the particles of the original soft, carbonaceous raw material. The particles reconstituted, formed, carbonized and activated in this manner exhibit a hardness and abrasion resistance much greater than that of the product of prior methods using the same carbonaceous raw material.

Tests of an activated carbon produced by employing the teachings of the present invention and intended for gas phase applications showed that it possessed a carbon tetrachloride adsorption activity greater than 95 percent and a ball pan hardness value of nearly 97, superior to most coconut carbons produced by the steam activated process. Another activated carbon produced by the present invention and intended for liquid phase applications possessed a molasses decolorizing value of 90 and a ball pan hardness value of nearly 92.

Activated carbon produced from the same carbonaceous raw material using the prior art method which does not incorporate the binder material possessed a ball pan hardness in the range of 60 to 70 percent. It should be pointed out that such a product is not commercially competitive for most commercial applications requiring a hard, abrasionresistant, granular activated carbon.

The results of these tests indicate that very hard, shaped, activated carbon particles can be produced by use of the method of the present invention from relatively soft carbonaceous raw materials such as wood, straw, peat and the low rank brown coals, and similar carbonaceous materials possessing comparable ability to absorb the chemical activating agent.

Further, it has been discovered that the hardness of the activated carbon can be controlled, within certain limits, by proportioning the amounts of the carbonaceous raw material and the carbonaceous binder material relative to the amount of carbon which each contributes to the total carbon content of the mixture. For example, when the carbon content of the binder material comprised approximately 24 percent of the total carbon content of the initial mixture, the ball pan hardness of the activated carbon product was approximately 85 percent. Increasing the binder carbon contribution to approximately 28 percent of the total carbon in the mixture results in an increase of the ball pan hardness value of the end product to approximately 90 percent. Increasing the contribution of carbon from the binder material to approximately 33 percent of the total carbon formed in the initial mixture increased the ball pan hardness of the activated carbon product to 96 percent.

The maximum content of binder material in the mixture is limited by economic considerations, since the carbon content of the binder material is more expensive than that of the preferred carbonaceous raw materials; and by the fact that hardness values in excess of approximately 97 percent require disproportionately large increases in the content of binder material.

While lesser amounts of binder material do increase that ball pan hardness value of the activated carbon substantially over prior methods, a granular activated carbon must have a ball pan hardness value of at least approximately 85 percent in order to compete with steam activated carbons produced from hard carbonized raw materials in most gas and column type liquid phase applications.

It is important to point out that the present invention provides a truly significant advance in the art by providing a chemical activation process which is effectively competitive with the steam activation process.

Prior to the present invention, in spite of the advantages of chemical activation relative to higher yields, greater control of pore structure, and less expensive capital equipment costs; chemically activated granular carbon had only a relatively small market demand. However, employing the teaching of the present invention provides a method of chemical activation of reconstituted, granular carbon of at least equal quality, and in many respects of even more desirable characteristics than any type of carbon produced by prior chemical as well as steam activation methods.

Further details of the present invention will be set forth with respect to the following examples:

EXAMPLE I.

10 parts of ground wood were mixed with 3 parts of ammonium lignosulfonate and 13 parts of 85 percent phosphoric acid. The compounds were mixed, extruded into pellet shapes, then carbonized/activated in a rotary furnace at 500°centigrade for 75 minutes. The formed pellets were sufficiently strong to withstand tumbling in the rotary furnace. After being discharged from the furnace, the pellets were washed in hot water to recover the phosphoric acid, then dried. The resultant activated carbon pellets had a carbon tetrachloride activity of 69 percent and a ball pan hardness value of approximately 85 percent.

EXAMPLE II.

10 parts of ground wood were mixed with 7.5 parts of 50 percent ammonium lignosulfonate solution and 7.5 parts of 75 percent phosphoric acid. The mixture was extruded into pellet shapes, then carbonized/activated at 550°centigrade for 120 minutes. The resulting activated carbon had a carbon tetrachloride activity of 60 percent, an iodine activity of 79 percent, and a ball pan hardness value of 90 percent.

EXAMPLE III.

10 parts of wood flour were mixed with 9.25 parts of 50 percent ammonium lignosulfonate solution and 6.65 parts of 75 percent phosphoric acid. The pellets extruded from the mixture were carbonized/activated for 90 minutes at a temperature of 575° centigrade. The activated carbon produced had a carbon tetrachloride activity of 67 percent and a ball pan hardness of 95 percent.

EXAMPLE IV.

10 parts of wood flour were mixed with 2 parts of ammonium lignosulfonate solids, 6 parts of 50 percent ammonium lignosulfonate solution and 17.3 parts of 85 percent phosphoric acid. The pellets extruded from the mixture were carbonized/activated at a temperature of 525°centigrade for 110 minutes. The activated carbon product had a carbon tetrachloride activity of 96 percent, a surface area of 1,500 square meters per gram and a ball pan hardness value of 97 percent.

EXAMPLE V.

10 parts of ground wood were mixed with 2 parts of ammonium lignosulfonate solids, 4 parts of 50 percent ammonium lignosulfonate solution and 20 parts of 67 Baume zinc chloride solution. The pellets extruded from the mixture were carbonized/activated at a temperature of 625° centigrade for 135 minutes. The resulting activated carbon had a molasses decolorizing value of 90 and a ball pan hardness value between 91 and 92.

EXAMPLE VI.

10 parts of ground sawdust were mixed with 3.2 parts of polyvinyl alcohol and 17.5 parts of 85 percent phosphoric acid. The pellets extruded from the mixture were carbonized/activated for 100 minutes at a temperature of 550°centigrade. The activated carbon produced had a carbon tetrachloride activity of 90 percent and a ball pan hardness value of nearly 91.

What is claimed is:

1. A chemical activation process for the manufacture of granular activated carbon comprising the steps of forming a mixture having a consistency permitting the pelleting of granular shaped particles including the following: a ground solid raw carbonaceous starting material possessing an oxygen content of at least approximately 25 percent by weight on a moisture and ash free basis taken from a group consisting of wood, straw and low-rank brown coals, a carbonaceous binder material taken from a group consisting of lignosulphonates and polyvinyl alcohols which are soluble or emulsifiable in water or phosphoric acid solutions, the amount of the binder material being sufficient to contribute at least approximately 24 percent by weight of the total carbon present in the initial mixture formed, and an amount of phosphoric acid sufficient to form a ratio of 100 percent phosphoric acid to the dry basis mixture of the starting material and the binder material of at least 0.35 to 1; forming solid grnaular shaped particles of predetermined size from said mixture; heat treating said shaped particles for a predetermined time at a temperature no greater than approximately 650°C to form a granular activated carbon product having a ball-pan hardness value of approximately 85 percent or greater.

2. The process defined in claim 1 wherein said solid raw starting material is ground wood flour.

3. The method defined in claim 1 including proportioning the amounts of said raw carbonaceous material and said carbonaceous binder material in the mixture to achieve a contribution of carbon in the initial mixture by the binder material of at least approximately 28 percent by weight to achieve a ball pan hardness value of the end product of at least 90 percent.

4. A granular activated carbon product having a ball pan hardness value of at least 85 and formed by a process comprising the steps of forming a mixture having a consistency permitting the pelleting of solid granular shaped particles comprising a ground naturally occurring carbonaceous starting material possessing an oxygen content of at least 25 percent by weight on a moisture and ash free basis taken from a group consisting of wood, straw and low-rank brown coals, a binder material taken from a group consisting of lignosulphonates and polyvinyl alcohols which are soluble or emulsifiable in water or solutions of phosphoric acid, the amount of said binder material being sufficient to contribute at least approximately 24 percent by weight of the total carbon present, and phosphoric acid in a ratio of 100 percent phosphoric acid to the dry basis total of the starting material and the binder of at least 0.35 to 1; forming granular pellets from said mixture of predetermined size and shape; and heating said formed pellets at a temperature effective to simultaneously carbonize and activate said pellets to form said activated granular carbon product.

5. A chemical activation method of manufacturing granular activated carbon comprising the steps of forming a mixture having a consistency permitting the pelleting of granular shaped solid particles, said mixture including a ground raw carbonaceous material possessing an oxygen content of at least approximately 25 percent by weight on a moisture and ash free basis and taken from a group consisting of wood, straw and low rank brown coals, a carbonaceous binder material taken from a group consisting of lignosulphonates and polyvinyl alcohols which are soluble or emulsifiable in water or solutions of phosphoric acid and zinc chloride, and an effective amount of an inorganic activating agent to substantially carbonize and activate said mixture of raw material and binder taken from a group consisting of phosphoric acid and zinc chloride, the amount of said binder material being sufficient to contribute at least approximately 24 percent by weight of the carbon in the initial mixture based upon the total amount of carbon contributed by the raw material and the binder material; forming shaped granular pellets from said mixture and subsequently heat treating said pellets at effective temperature levels to achieve conventional carbonization and activation levels and a ball-pan hardness of the pelleted end product of at least 85 percent.

6. The method defined in claim 5 including proportioning the amounts of said raw carbonaceous material and said carbonaceous binder material in the mixture to achieve a contribution of carbon in the initial mixture of the binder material of at least approximately 28 percent by weight to achieve a ball pan hardness value of the end product of at least 90 percent.

* * * * *